(12) United States Patent
Shan

(10) Patent No.: US 10,824,710 B2
(45) Date of Patent: Nov. 3, 2020

(54) METHOD AND DEVICE FOR AUTHENTICATING APPLICATION THAT REQUESTS ACCESS TO MEMORY

(71) Applicant: MONTAGE TECHNOLOGY CO., LTD., Shanghai (CN)

(72) Inventor: Gang Shan, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 15 days.

(21) Appl. No.: 15/646,106

(22) Filed: Jul. 11, 2017

(65) Prior Publication Data

US 2018/0157822 A1 Jun. 7, 2018

(30) Foreign Application Priority Data

Dec. 7, 2016 (CN) .......................... 2016 1 1115077

(51) Int. Cl.
*G06F 21/44* (2013.01)
*G06F 12/14* (2006.01)

(52) U.S. Cl.
CPC .......... *G06F 21/44* (2013.01); *G06F 12/1458* (2013.01)

(58) Field of Classification Search
CPC ....................................... G06F 12/1425–1441
See application file for complete search history.

(56) References Cited

U.S. PATENT DOCUMENTS

| | | | | |
|---|---|---|---|---|
| 10,447,728 B1* | 10/2019 | Steinberg | ................. | H04L 63/20 |
| 2006/0294513 A1* | 12/2006 | Bar-El | ................... | G06F 21/572 |
| | | | | 717/168 |
| 2008/0109903 A1* | 5/2008 | Werner | ................ | G06F 12/1433 |
| | | | | 726/22 |
| 2015/0278118 A1* | 10/2015 | Lee | ......................... | G06F 12/145 |
| | | | | 711/102 |
| 2017/0060779 A1* | 3/2017 | Falk | ..................... | G06F 12/1408 |
| 2017/0068811 A1* | 3/2017 | Liu | .......................... | G06F 21/85 |
| 2017/0293581 A1* | 10/2017 | Villatel | ................... | G06F 13/40 |

(Continued)

FOREIGN PATENT DOCUMENTS

CN 1647039 7/2005
CN 104951405 A 9/2015

OTHER PUBLICATIONS

Gundu et al. "A Case for Near Data Security." Dec. 2014. http://www.cs.utah.edu/wondp/gundu.pdf. WoNDP.*

(Continued)

*Primary Examiner* — Nathan Sadler
(74) *Attorney, Agent, or Firm* — Jun He Law Offices P.C.; James J. Zhu

(57) ABSTRACT

The present application provides a method for authenticating an application that requests access to a memory, comprising: acquiring an authentication request provided by the application; acquiring a characteristic instruction provided by the application in response to the authentication request; acquiring an instruction pointer corresponding to the characteristic instruction; acquiring from the memory characteristic information of the application which is pre-stored in the memory based on the instruction pointer; and comparing the acquired characteristic information with authentication information corresponding to the application, so as to determine whether the authentication of the application is successful.

19 Claims, 2 Drawing Sheets

(56) References Cited

U.S. PATENT DOCUMENTS

2017/0371573 A1* 12/2017 Kim ................. G06F 3/0622
2019/0095389 A1*  3/2019 Barnes ............... G06F 9/355

OTHER PUBLICATIONS

Patterson et al. Computer Organization and Design. 2014. Morgan Kaufmann. 5th ed. pp. 19-23, 251-272, 378-383.*
Rogers et al. "Using Address Independent Seed Encryption and Bonsai Merkle Trees to Make Secure Processors OS- and Performance-Friendly." Dec. 2007. IEEE. Micro 40. pp. 183-194. (Year: 2007).*
The First Office Action in Chinese Patent Application No. 201611115077.9, dated Jul. 30, 2019.
Akhila Gundu et al, "A case for Near Data Security", Dec. 14, 2014, p. 1-6.

* cited by examiner

METHOD AND DEVICE FOR AUTHENTICATING APPLICATION THAT REQUESTS ACCESS TO MEMORY

CROSS REFERENCES TO RELATED APPLICATIONS

This application claims priority to Chinese Patent Application Number 201611115077.9 filed on Dec. 7, 2016, the entire content of which is incorporated herein by reference.

TECHNICAL FIELD

The present application relates to memory technology and, in particular, to a method and device for authenticating an application that requests access to a memory.

BACKGROUND

The rapid development of Internet technology enables network devices such as computers and mobile terminals to connect and communicate with each other. People can easily obtain information through these connected network devices. However, data and information security issues are increasingly emerging, along with the convenience of obtaining information. Networked devices may be easily attacked by applications of unauthorized external devices due to accidental or malicious reasons, resulting damages, disclosures, or alterations of internal data of the networked devices.

Therefore, there is a need to improve existing computers or other electronic devices so as to improve their data security.

SUMMARY

An objective of the present application is to provide a method and device for authenticating an application, which has high security and reliability.

According to one aspect of the present application, a method for authenticating an application that requests access to a memory comprises: acquiring an authentication request provided by the application; acquiring a characteristic instruction provided by the application in response to the authentication request; acquiring an instruction pointer corresponding to the characteristic instruction; acquiring, from the application which is pre-stored in a memory, characteristic information of the application based on the instruction pointer; and comparing the acquired characteristic information with the authentication information corresponding to the application, so as to determine whether the authentication of the application is successful.

According to another aspect of the present application, a device for authenticating an application that requests access to a memory comprises: a processor configured to: acquire an authentication request provided by the application; acquire a characteristic instruction provided by the application in response to the authentication request; and acquire an instruction pointer corresponding to the characteristic instruction; a memory configured to store the application; a memory controller coupled to the processor and the memory, and configured to: receive the instruction pointer, and acquire, from the application which is pre-stored in the memory, the characteristic information of the application based on the instruction pointer; and compare the acquired characteristic information with the authentication information corresponding to the application, so as to determine whether the authentication of the application is successful.

It can be seen that, the device and method for authenticating an application that requests access to a memory according to the present application utilizes a characteristic instruction provided by a "living" application accessing the memory so as to acquire characteristic information of the application, thereby verifying the characteristic information with authentication information pre-stored in the memory. This prevents an illegal or unauthorized application from maliciously impersonating the application to access the memory, and it is unnecessary to provide transferable characteristic information to external devices. This approach significantly improves the security and reliability of the memory system.

The foregoing is a summary of the present application, which may simplify, summarize, and omit the details, and those skilled in the art will recognize that this section is merely illustrative and not intended to limit the scope of the present application in any way. This summary section is neither intended to identify key features or essential features of the claimed subject matter or as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limit to the scope of the present application. The contents of the present application will be elucidated more explicitly and detailedly by the accompanying drawings.

DETAILED DESCRIPTION

Figure 1:
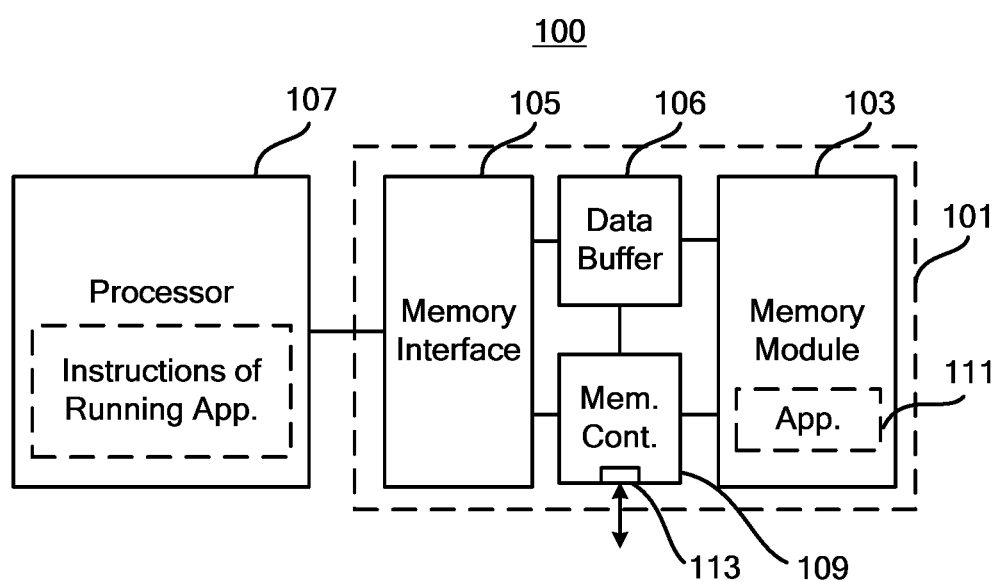
FIG. 1 illustrates a device 100 for authenticating an application that requests access to a memory according to an embodiment of the present application.

In the following detailed description, reference is made to the accompanying drawings which form a part thereof. In the drawings, like reference numerals generally refer to like parts unless otherwise indicated in the context clearly. The illustrative embodiments described in the detailed description, drawings and claims are not intended to be limiting. Other embodiments may be employed and other changes may be made without departing from the spirit or scope of the subject matter of the present application. It is to be understood that various different arrangements, substitutions, combinations and designs, made to various aspects of the present application generally described in this application and illustrated in the drawings, are intended to constitute a part of this application explicitly.

The inventor of the present application found that, for a computer, a mobile terminal or other intelligent electronic devices, a memory interface connecting a memory (the memory described herein refers to a main memory, commonly known as a memory) and a processor (e.g., a CPU of a computer, or a microprocessor of a mobile terminal) is the key interface of its system architecture. When a computer or an intelligent electronic device is operating normally, instructions and non-instruction data on which a running application depends are all stored in the memory for invoking by the processor. Thus, the processor needs to continuously access the memory via the memory interface, so as to obtain the instruction and non-instruction data stored in the memory.

In view of this, the inventor of the present application designs a new access control mechanism in the memory interface for authenticating applications that request access to the memory. An application can obtain access to the memory only after the authentication is successful. This access control mechanism prevents an unauthorized application from accessing the memory illegally and invoking or modifying the data and instructions stored therein. In this way, the stability and safety of computers or intelligent electronic devices can be significantly improved.

FIG. 1 illustrates a device 100 for authenticating an application that requests access to a memory according to an embodiment of the present application. In the embodiment, the memory can be a memory conforming to JEDEC double data rate synchronous dynamic random access memory (SDRAM) standard that includes JEDEC DDR1, DDR2, DDR3, DDR4 and other double data rate memory standards. In addition, the memory may also be a memory that conforms to other standards or protocols, such as a SDRAM or RAMBUS memory, or a memory that conforms to future memory standards or protocols. In some embodiments, a memory module of the memory may include a volatile memory (e.g., a random access memory), a non-volatile memory (e.g. a flash memory), or a combination thereof.

As shown in FIG. 1, the device 100 includes a memory 101 having a memory module 103. The memory module 103 may be a memory chip of a single memory die, or may be a memory module including two or more memory dies. The memory module 103 may include a plurality of memory cells, each of which has an addressable storage address and can be used to store an instruction or data (e.g., application data) of certain size. Each memory cell in the memory module 103 can be operated respectively by addressing the memory module 103 according to the storage address corresponding to each memory cell.

The memory 101 also has a memory interface 105 via which the memory module 103 can interact with a processor 107. For example, via the memory interface 105, the processor 107 reads out, from the memory module 103, the instructions and data stored therein, or the processor 107 writes instructions or data into the memory module 103.

The memory 101 also includes a memory controller 109, which is directly or indirectly coupled to the processor 107 and the memory module 103 for controlling data interaction therebetween. For example, in the embodiment shown in FIG. 1, the memory controller 109 is disposed outside the memory interface 105 and coupled to the processor 107 through the memory interface 105. In some embodiments, the memory 101 also includes a data buffer 106, which may be coupled between the memory interface 105 and the memory module 103, and also be coupled to the memory controller 109. By controlling the data buffer 106, the memory controller 109 is able to control the data interaction between the processor 107 and the memory module 103. In a memory conforming to the DDR4 standard, the memory controller 109 is, for example, a register clock driver (RCD), which can control the operation of the data buffer 106 through a data buffer control bus (BCOM) and can be coupled to the memory interface 105 via a command/address (C/A) bus. In addition, a number of control logic and registers may be disposed in the register clock driver for implementing the memory controller 109. In some alternative embodiments, the memory controller may also be disposed inside the memory interface 105

The processor 107 is configured to execute various applications, and access the memory 101 according to the operating requirements of the applications, such as writing instructions/data thereinto or reading instructions/data therefrom. Specifically, when the processor 107 runs an application, whether the application is a local application (e.g., stored in a mass-storage memory of a computer, such as a hard disk) or an external application (e.g., an application from an external network device), the processor 107 would load the application into the memory 101 and then continuously access the memory 101 to acquire the respective instructions of the application loaded into the memory 101. Then, the processor 107 would execute the acquired instructions in certain order, thereby execute the application.

It will be appreciated that, the storage location of an application's codes in the memory module 103 is generally definite, after the codes have been loaded into the memory 101. Accordingly, the codes of one or more instructions before and after the codes of certain instruction are also definite. Thus, information such as the codes of an application stored in the memory module 103 can be used to identify an application which is about to run or is running. In an embodiment of the present application, the processor 107 can cooperate with the memory controller 109 to complete the authentication of the application that requests access to the memory module 103. After the authentication is passed, the subsequent instructions of the application stored in the memory module 103 can be executed by the processor 107 sequentially.

Figure 2:
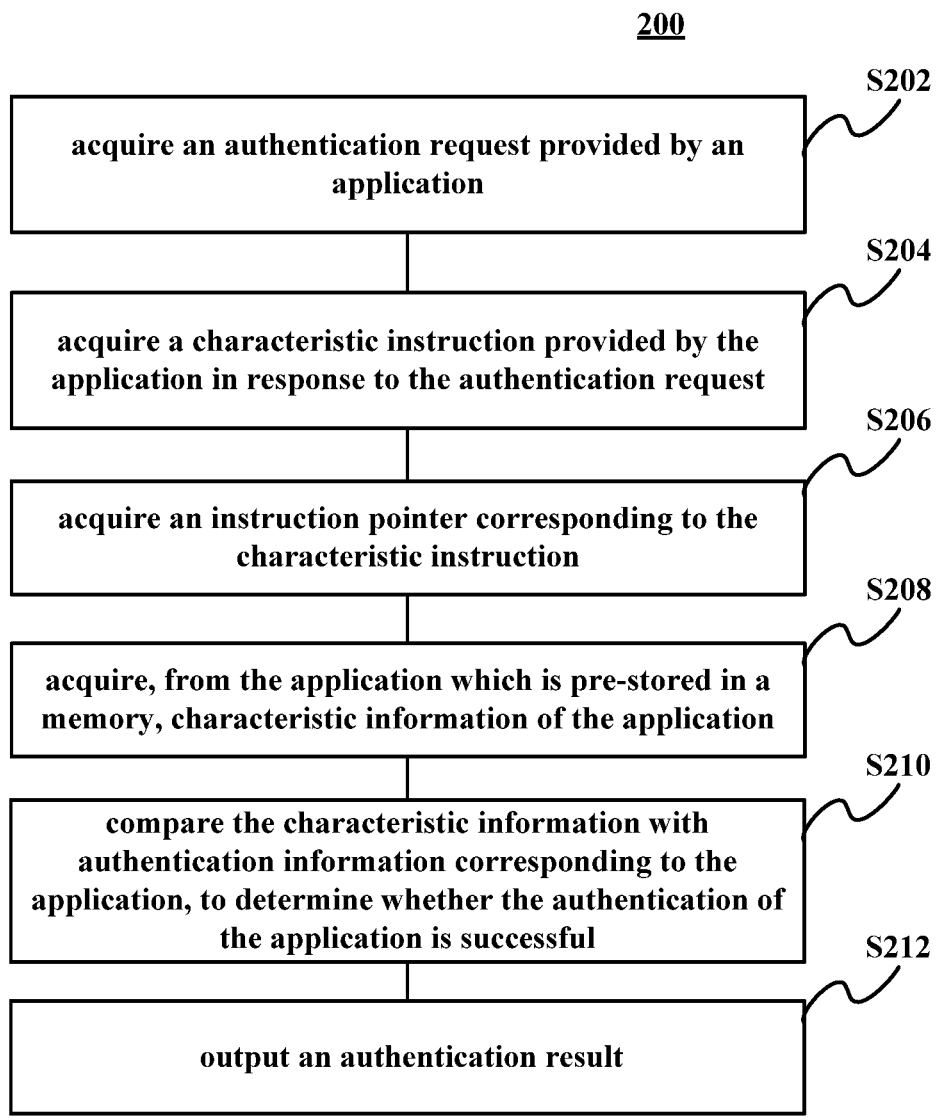
FIG. 2 illustrates a method 200 for authenticating an application that requests access to a memory according to an embodiment of the present application.

Based on the above concepts, the present application provides a method for authenticating an application that requests access to a memory. FIG. 2 illustrates a flow diagram of an authentication method 200 according to an embodiment of the present application. The method 200 may be implemented in the device 100 as shown in FIG. 1.

The specific functions and operations of the method 200 and the device 100 of the present application, taking authenticating an application 111 shown in FIG. 1 as an example, will be described in detail with reference to FIGS. 1 and 2, Specifically, the method 200 starts at step S202. At step S202, the processor 107 acquires an authentication request provided by an application. The authentication request may be a preset instruction contained in the application. In some instances, the authentication request may be set at an initial position of the application such that the authentication of the application can be initiated right after the application starts running, to determine whether to continue executing the remaining instructions of the application stored in the memory 101 In other instances, the authentication request can be set at other positions of the application. For example, the operation of a part of the instructions of the application may require access to certain restricted areas in the memory 101, in such case the instruction of the authentication request may be set before this part of the instructions. In addition, it will be appreciated that in some embodiments, the processor 107 may also receive or acquire the program name or similar identification information of the application while receiving the authentication request, in order to determine which application is providing the authentication request.

The flow of authenticating the application starts after the authentication request is received.

Specifically, at step S204, in response to the authentication request, the processor 107 acquires a characteristic instruction provided by the application. Similar to the authentication request, the characteristic instruction is also an instruction preset in the application. The characteristic instruction can be set immediately after the authentication request, or can be set after the authentication request but not immediately following the authentication request. For example, the characteristic instruction can be separated from the authentication request by one or more instructions. In some embodiments, the processor 107 may run a specific authentication program to identify the characteristic instruction provided by the application. It will be appreciated that the characteristic instruction is also obtained by the processor 107 accessing to the memory 101.

Next, at step S206, the processor 107 acquires an instruction pointer corresponding to the characteristic instruction. Generally, the processor 107 includes a program counter (not shown) configured to contain a storage address of the currently running instruction in the memory module 103, i.e., the instruction pointer. After the processor 107 executes an instruction, the instruction pointer in the program counter changes (e.g., adding one automatically), thereby pointing to a storage address of the next instruction of the application in the memory module 103. In this way, the processor 107 may then read the codes of the next instruction from the storage address.

It can be seen that, when executing the characteristic instruction, the processor 107 can determine, with the program counter, a storage location in the memory module, which may be a storage address of the characteristic instruction in the memory module 103. The processor 107 may also include a pointer register (not shown) for storing an instruction pointer. For example, when the processor 107 determines the instruction pointer of a currently running characteristic instruction with the program counter, the instruction pointer is subsequently stored in the pointer register for further processing.

For a processor, if the program counter can determine the instruction pointer of an instruction contained in an application, it indicates that the application is an application which is currently running in the processor, i.e. a "live" application. For an illegal application, it may send an instruction of another legal application to the processor 107 for authentication; however, since the legal application is not actually running, the processor 107 does not have its corresponding instruction pointer, and thus the processor 107 cannot obtain a valid instruction pointer for authentication. Therefore, only the instruction provided by an actually running application can be recognized by the processor, so as to determine its corresponding instruction pointer. It can be seen that with the use of an instruction pointer of a "live" application for authentication, the security and reliability of authentication can be effectively improved.

Then, at step S208, the memory controller 109 acquires, from the application which is pre-stored in the memory module 103, characteristic information of the application based on the acquired instruction pointer.

In particular, the processor 107 sends the acquired instruction pointer to the memory controller 109 via the memory interface 105. Based on the instruction pointer, the memory controller 109 determines a storage location in the memory module 103 and determines the characteristic information of the application 111 using the codes of the application 111 stored in the storage location or its adjacent area. In some embodiments, the characteristic information of the application 111 is used to identify the application 111, which is, for example, at least a portion of the codes of the application 111. In some embodiments, for example, the characteristic information of the application 111 may be codes within a predetermined range of address length adjacent to the instruction pointer, such as the codes of the application 111 within a range which is hundreds of bytes to dozens of megabytes adjacent to the instruction pointer. As described above, since the storage location of the codes of the application 111 in the memory module 103 is relatively definite, the codes within the range adjacent to the instruction pointer of the characteristic instruction is also definite. Thus, such codes can be used to identify the application 111 itself and used as the characteristic information of the application 111.

In some examples, the characteristic information may be acquired based on at least a portion of the codes of the application corresponding to the characteristic instruction. For example, this portion of the codes can be encrypted, or coded with other specific coding algorithms, and then, the processed information or data can be used as the characteristic information of the application. This approach has better security and reliability.

Next, at step S210, the memory controller 109 compares the acquired characteristic information with authentication information corresponding to the application, so as to determine whether the authentication of the application is successful.

In order to verify the characteristic information, the memory controller 109 also stores the authentication information, which is data pre-stored in the memory controller 109 and is in association with the characteristic information, for example, a part of the codes of the application 111. Alternatively, the authentication information further includes the name or other identification information of the application. The memory controller 109 may compare the characteristic information obtained using the characteristic instruction with the authentication information, so as to determine whether the authentication of the application 111 is successful. Specifically, if the characteristic information coincides with the authentication information, it is determined that the authentication is successful; and if the characteristic information does not coincide with the authentication information, it is determined that the authentication is unsuccessful. For example, each of the stored authentication information is associated with a program name. The memory controller 109 can obtain the program name of the application 111 and retrieve the corresponding authentication information based on the program name. The program name may be provided by the application 111 when sending an authentication request. It will be appreciated that when the characteristic information is processed data or information of a part of the codes, the authentication information also needs to be processed similarly in advance.

In some examples, the memory controller 109 may store a plurality of pieces of authentication information about the application 111, and the authentication can be determined as successful as long as the characteristic information of the application 111 coincides with one piece of the authentication information. In other words, a plurality of pieces of authentication information may correspond to one program name. For example, the entire program of the application 111 contains three characteristic instructions, and the codes of each characteristic instruction are stored at a separate location in the memory module 103. Thus, the storage location of each characteristic instruction corresponds to one piece of the characteristic information, which may be pre-stored in the memory controller 109 as a piece of candidate authentication information. When the processor 107 executes the characteristic instruction provided by the application 111, the characteristic instruction may be one of the aforementioned three characteristic instructions. The processor 107 can use the instruction pointer of the characteristic instruction to determine the corresponding characteristic information. Next, the characteristic information can be compared with the three pieces of candidate authentication information, and the authentication can be determined as successful as long as the characteristic information of the application 111 coincides with one of the pieces of authentication information.

At step S212, the memory controller 109 may output an authentication result to the processor 107 after the authentication result is obtained. Further, the processor 107 may decide whether to allow or restrict subsequent access of the application 111 to the memory 101 based on the authentication result, i.e. whether subsequent instructions of the application 111 stored in the memory 101 can be executed. Optionally, the memory controller 109 may also provide the authentication result directly to the data buffer 106 to allow or restrict the subsequent access of the application 111 with the data buffer 106. It can be seen that, since the authentication information for verifying the characteristic information is set in the memory 101 and the processor 107 cannot obtain the authentication information, the device 100 can effectively prevent the security problem caused from disclosure of the authentication information.

In some embodiments, the memory controller 109 may generate an access key after the authentication result is obtained. Subsequently, the access key may be provided to the application and stored in the memory controller 109 at the same time. The application's subsequent requests or instructions to access the memory may all include the access key. The memory controller 109 verifies the access key provided by the application using a locally stored key, i.e. determining whether the application can continue to access the memory 101.

In some embodiments, in order to further improve the security of the memory, the authentication information may be stored in the memory controller 109 in a read-only manner, so that the authentication of the application cannot be disrupted by modifying the authentication information. For example, the memory controller 109 may incorporate a read-only memory for storing the authentication information. In some alternative embodiments, the authentication information may be stored in the memory controller 109 in a revisable manner, but new authentication information can be written into the memory controller 109 only by a dedicated authentication information write interface 113. The authentication information write interface 113 is different from a data read/write interface (e.g., a C/A interface) in the memory interface for direct data interaction between the memory module 103 and the processor 107. In some examples, the authentication information write interface 113 may be a SMBus (System Management Access Bus) interface, or similar standalone interfaces. In this way, only a manager or operator of the memory or system can initialize, modify, replace and/or set the authentication information through authentication information write interface 113, which also guarantees the security of the memory 101.

It can be seen that, the device for authenticating an application that requests access to a memory according to the present application utilizes a characteristic instruction provided by a "living" application that is currently accessing to the memory so as to acquire characteristic information of the application. The characteristic information is further verified with pre-stored authentication information in the memory. This prevents an illegal application from maliciously impersonating the application to access the memory, and it is unnecessary to provide transferable characteristic information to external devices. This approach significantly improves the security and reliability of the memory system.

It should be noted that, although some of the modules or sub-modules of the method and device for authenticating the application accessing the memory are mentioned in the detailed description above, such division is merely exemplary rather than mandatory. In fact, according to embodiments of the present application, the features and functions of the two or more modules described above may be embodied in one module. Conversely, the features and functions of one module described above can be further subdivided into a plurality of modules.

Those skilled in the art will be able to understand and implement other changes to the disclosed embodiments by studying the specification, disclosure, drawings and appended claims. In the claims, the wordings "comprise", "comprising", "include" and "including" do not exclude other elements and steps, and the wordings "a" and "an" do not exclude the plural. In the practical application of the present application, one component may perform the functions of a plurality of technical features cited in the claims. Any reference numeral in the claims should not be construed as limit to the scope.

The invention claimed is:

1. A method for authenticating an application, the application being executed by a processor that requests access to a memory coupled to the processor via a memory controller, the method comprising:

acquiring, via the processor, an authentication request provided by the application;

acquiring, via the processor, a characteristic instruction provided by the application in response to the authentication request;

acquiring, via the processor, from a program counter of the processor, an instruction pointer corresponding to the characteristic instruction, when the characteristic instruction is executed by the processor, wherein the instruction pointer points to a storage address of the characteristic instruction in the memory; wherein if no instruction pointer corresponding to the characteristic instruction is acquired from the program counter then stopping the following steps;

sending, via the processor, the instruction pointer to the memory controller;

determining, via the memory controller, a storage address of characteristic information in the memory based on the instruction pointer received from the processor;

acquiring, via the memory controller, from the storage address of characteristic information, the characteristic information of the application which is pre-stored in the memory, wherein the characteristic information comprises at least a part of codes of the application corresponding to the characteristic instruction;

comparing, via the memory controller, the acquired characteristic information with authentication information corresponding to the application and pre-stored in the memory controller; and determining, via the memory controller, that the application is an unauthorized application in response to that the acquired characteristic information does not coincide with the authentication information, and denying subsequent access of the application to the memory when it is determined that the application is an unauthorized application; or determining, via the memory controller, that the application is an authorized application in response to that the acquired characteristic information coincides with the authentication information, and allowing subsequent access of the application to the memory when it is determined that the application is an authorized application and running.

2. The method of claim 1, wherein the step of acquiring the instruction pointer corresponding to the characteristic instruction comprises:
storing the instruction pointer.

3. The method of claim 1, wherein the storage address of the characteristic information is within a predetermined address range adjacent to the instruction pointer.

4. The method of claim 1, wherein the characteristic information is acquired based on at least a part of a code of the application corresponding to the characteristic instruction.

5. The method of claim 1, wherein the step of comparing the acquired characteristic information with the authentication information corresponding to the application so as to determine whether the authentication of the application is successful is executed by the memory controller.

6. The method of claim 5, wherein the authentication information is stored in the memory controller in a read-only manner, or the authentication information is written into the memory controller through a dedicated interface.

7. The method of claim 5, further comprising:
outputting an authentication result by the memory controller.

8. The method of claim 1, further comprising:
stopping, via the processor, execution of instructions subsequent to the characteristic instruction in response to that the application is determined to be the unauthorized application; or
executing, via the processor, the instructions subsequent to the characteristic instruction in response to that the application is determined to be the authorized application.

9. A device for authenticating an application that is being executed by a processor and requests access to a memory, comprising:
the processor, wherein the processor comprises a program counter and is configured to:
acquire an authentication request provided by the application;
acquire a characteristic instruction provided by the application in response to the authentication request;
acquire, from the program counter, an instruction pointer corresponding to the characteristic instruction, when the characteristic instruction is executed by the processor, wherein the instruction pointer points to a storage address of the characteristic instruction in the memory; and
send the instruction pointer to the memory controller if the instruction pointer corresponding to the characteristic instruction is acquired from the program counter;
a memory configured to store the application; and
a memory controller coupled to the processor and the memory, and configured to:
receive the instruction pointer, determine a storage address of characteristic information in the memory based on the instruction pointer, and acquire, from the storage address of characteristic information, the characteristic information of the application which is pre-stored in the memory, wherein the characteristic information comprises at least a part of codes of the application corresponding to the characteristic instruction; and
compare the acquired characteristic information with the authentication information corresponding to the application and pre-stored in the memory controller; and
determine that the application is an unauthorized application in response to that the acquired characteristic information does not coincide with the authentication information, and deny subsequent access of the application to the memory when it is determined that the application is an unauthorized application; or
determine that the application is an authorized application in response to that the acquired characteristic information coincides with the authentication information, and allow subsequent access of the application to the memory when it is determined that the application is an authorized application and running.

10. The device of claim 9, wherein the processor further comprises:
a pointer register configured to store the instruction pointer corresponding to the characteristic instruction acquired by the processor;
wherein the processor is further configured to control storing the instruction pointer from the program counter to the pointer register as the instruction pointer corresponding to the characteristic instruction, when the characteristic instruction is being executed.

11. The device of claim 9, wherein the storage address of the characteristic information is within a predetermined address range adjacent to the instruction pointer.

12. The device of claim 9, wherein the characteristic information is acquired based on the at least a part of the codes of the application corresponding to the characteristic instruction.

13. The device of claim 9, wherein the memory controller is further configured to store the authentication information in a read-only manner.

14. The device of claim 9, further comprising an authentication information write interface coupled to the memory controller, and the authentication information is written into the memory controller via the authentication information write interface.

15. The device of claim 14, wherein the authentication information write interface is different from a data read/write interface of the memory.

16. The device of claim 9, wherein the memory controller is further configured to provide an authentication result of the application to the processor.

17. The device of claim 9, wherein the memory controller is a register clock driver.

18. The device of claim 17, wherein the register clock driver conforms to a JEDEC DDR4 register standard.

19. The device of claim 9, the processor is further configured to:
stop execution of instructions subsequent to the characteristic instruction in response to that the application is determined to be the unauthorized application; or
execute the instructions subsequent to the characteristic instruction in response to that the application is determined to be the authorized application.

* * * * *